May 2, 1967 — N. A. EVANS — 3,317,130

DURATION OF FLIGHT INDICATOR

Original Filed June 25, 1964

INVENTOR.
NICHOLAS A. EVANS
BY
Q. Baxter Warns
ATTORNEY

United States Patent Office 3,317,130
Patented May 2, 1967

3,317,130
DURATION OF FLIGHT INDICATOR
Nicholas A. Evans, 440 Mt. Vernon Road,
Newark, Ohio 43055
Original application June 25, 1964, Ser. No. 378,084. Divided and this application Sept. 28, 1965, Ser. No. 505,776
1 Claim. (Cl. 235—83)

The invention described herein may be manufactured and used by or for the Government of the United States of America for governmental purposes without the payment of any royalties thereon or therefor.

This is a division of my application entitled, "Duration of Flight Indicator," Ser. No. 378,084, filed June 25, 1964, now abandoned.

This invention relates in general to flight indicators and more particularly to a device for use in connection with existing instrument panel indicators having scales so as to provide a direct reading of the time of flight remaining with allowance for the desired amount of reserve fuel at the conclusion of a flight.

In the field of aircraft operation, encompassing propeller craft but especially in reference to jet aircraft, the operator must be continually aware of the flight time remaining based upon a desired reserve fuel allowance. Awareness of the duration of flight remaining is particularly important in carrier aircraft operation since the limited landing areas available and the possibility of sudden weather changes make it imperative that the operator of the aircraft have instantaneous information as to the amount of fuel remaining. In regards to all aircraft, during inclement weather the pilot must always be aware of the amount of fuel remaining in order that a safe flight to an alternate airfield may be possible within the limits of fuel remaining.

At present, it is common practice for the pilot or copilot, or navigator if one is assigned, to monitor the amount of fuel remaining and to derive from this amount the duration of flight remaining. The present method for computing duration of flight remaining is to ascertain the amount of fuel remaining, subtract from that the amount of reserve fuel desired, allow for climb and letdown and then apply the remainder to determine the time available to cruise until landing is made. Normally, the calculations involved are made by a navigator or by the pilot on a computer, although it frequently occurs that the computations are made mentally by the pilot where the copilot or navigator are too preoccupied to use their hands. It is thus apparent that the present practice of determining the duration of flight remaining requires either mental calculation or manipulation of a computer such as a slide rule in order to provide or allow for a landing within the fuel limitations desired or necessary. The computation of flight duration remaining is especially urgent when additional duties are thrust upon the copilot and/or navigator such as making radio reports when flying the aircraft by instruments, tuning navigational receivers, etc.

The present invention is a much needed solution to the problem of providing instantaneous duration of flight remaining information not requiring mental calculations or the physical manipulation of a computer. Through the present invention a duration of flight indicator is provided which may be mounted on an instrument panel, more particularly on the fuel quantity indicator. The invention may be attached to fuel quantity indicators having scales and is adjustable to accommodate a variety of hourly fuel consumption data for use in reference to the fuel remaining to determine at a glance without calculation the allowable flight time remaining.

Accordingly, it is an object of the present invention to provide a duration of flight indicator which presents without manipulation or calculation continually the amount of time remaining for the flight based upon an estimated hourly rate of fuel consumption.

It is another object of this invention to provide a duration of flight indicator which is easily adjustable by hand to incorporate changes in hourly rate of fuel consumption.

It is a further object of this invention to provide a duration of flight indicator which is adaptable for attachment to substantially all fuel quantity gauges.

It is a still further object of the present invention to provide a duration of flight indicator which is adaptable for attachment to virtually all fuel quantity gauges and which provides at a glance the allowable remaining time for a flight taking into account the amount of reserve fuel desired upon completion of a flight.

Other objects and many of the attendant advantages of this invention will be readily appreciated as the same becomes better understood by reference to the following detailed description when considered in connection with the accompanying drawings in which like numerals designate like parts throughout and wherein.

Figure 1:
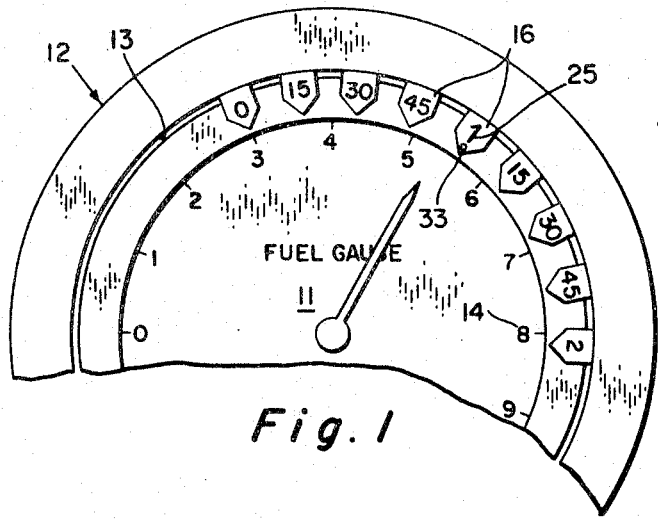
FIG. 1 is a plan view of one embodiment of the present invention in use on a conventional fuel quantity indicator.

Referring now to FIG. 1, there is shown a standard fuel quantity indicator or gauge 11 having a surrounding rim 12 in which is formed a slot 13. Extending through slot 13 are tabs 16 having display numerals thereon which indicate hours and minutes and which are disposed opposite the numerals on the scale 14 of fuel quantity gauge 11. The tabs 16 are movable in unison and, as seen in FIG. 2, are attached to an expanding linkage 18 which provides for equal spacing between the numerals upon extension or retraction of the linkage 18.

Figure 2:
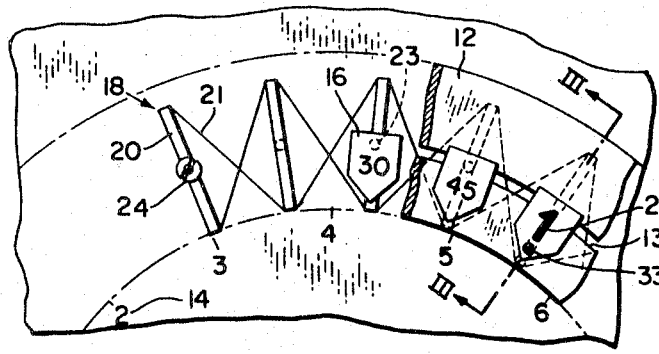
FIG. 2 is an exploded view partly in section of the present invention with some of the tabs removed showing how it is connected in relation to the conventional fuel quantity indicator shown in FIG. 1.

As further seen in FIG. 2, the tabs 16 are attached to transversely extending rods 20 which are interconnected by links 21. Attached to each of the rods 20 is an upstanding member such as post 23, shown in FIG. 3, the post 23 riding in slot 13 and providing guidance for the linkage 18 around the periphery of the gauge 11. The zero indicator of linkage 18 is anchored by conventional means such as bolt 24 into which the zero tab is threaded.

Figure 3:
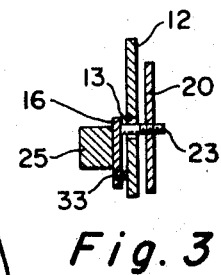
FIG. 3 is a sectional view taken along lines I—I of FIG. 2.

In FIG. 3, the tab 16 shown is that for the numeral indicating 1 hour and in this case the numeral is identified as 25 and is raised to provide a finger grip for movement of the linkage 18 through slot 13. The post 23 is attached by conventional means such as bolt threads to the rods 20. The tabs 16 are shown extending toward the center of the fuel quantity gauge and bearing the hours and minutes in 15 minute units, however, it will be appreciated that the tabs may extend in other directions and the minute and hour indications may be varied within the concept of the invention.

Figure 4:
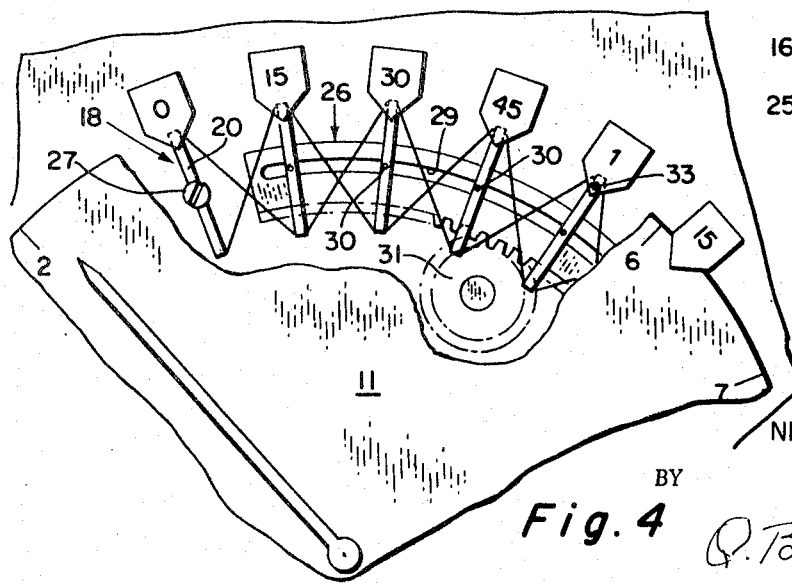
FIG. 4 shows an alternate embodiment of the invention, partly in section, in use on a conventional fuel quantity indicator.

Referring to FIG. 4, the expanding linkage 18 is shown in this embodiment to be mounted upon a circularly movable bar 26 which is preferably positioned behind the face of the fuel quantity gauge 11. In the embodiment of FIG. 4 the zero indicator of the expanding linkage 18 is anchored to the fuel quantity gauge or to the instrument panel therebehind opposite the desired number on the fuel quantity gauge by conventional means such as bolt 27. The bar 26 has a slot 29 in which the pins 30 attached to rods 20 ride to direct movement of the linkage. The linkage 18 is movable by rotating knob 31 which is positioned on the face of the fuel quantity gauge 11. The linkage 18 and bar 26 are arrested in movement at a desired point opposite a selected number on the fuel quantity gauge by set screw 33 which is inserted in the tab 16 of the number selected.

Figure 5:
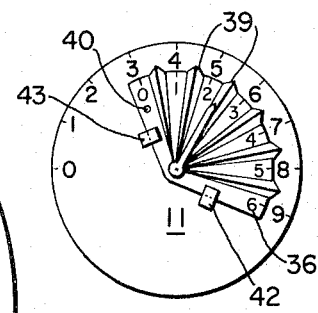
FIG. 5 shows an alternate form of the invention attached for use to a conventional fuel quantity indicator.
Figure 6:
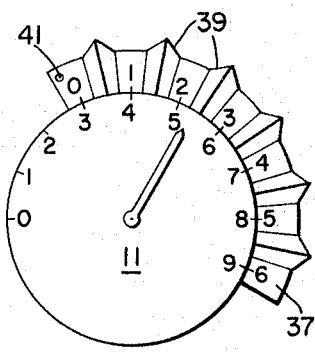
FIG. 6 is a further embodiment of the invention in use on a fuel quantity indicator.

In the embodiments of FIGS. 5 and 6, the secondary scales 36 and 37 are shown attached to conventional fuel quantity gauges and are positionable as desired about the periphery of the gauges so as to place the zero indicator of the secondary scale opposite a selected fuel quantity indicated on the fuel quantity gauge 11. The scales 36 and 37 in FIGS. 5 and 6, respectively, are held in place by set screws 40 and 41 and may be made extensible and retractable, for example by being fan-like in construction as indicated by lines 39 in scale 36. Such construction would provide the desired adjustment to permit a variety of hourly consumption of fuel rates to be set opposite the quantity of fuel consumed per hour as indicated on the fuel quantity gauge 11. The scale 36 may be affixed to fuel quantity gauge 11 by adhesive means such as tabs 43 in lieu of other means for affixing it.

The operation of the various embodiments is similar and involves determining a desired reserve fuel quantity and thereafter positioning the zero indicator of the expandable linkage 18 or a secondary scale 36 and 37 opposite such reserve fuel, for instance, 3,000 gallons as indicated in FIGS. 1, 5 and 6. After the zero indicator on the flight duration scales or linkage has been so positioned, it is held in place by tightening the appropriate set screw or bolt. Thereafter, the expanding linkage 18 may be extended as desired so that the hour indicator 1 is positioned opposite a fuel quantity the value of which when reduced by the amount of the reserve fuel setting represents the hourly consumption rate of the aircraft. In the embodiment of FIG. 1 the linkage 18 is positioned by gripping the extended numeral 25 and sliding the numeral tabs 16 along the indicator dial. In the embodiment of FIG. 4, the linkage is moved by rotating knob 31 until the hourly indicator 1 is positioned opposite the desired quantity of fuel. Set screw 33 is then tightened.

The foregoing invention thus provides a flight duration indicator including a movable scale which is easily positioned adjacent to the fuel quantity gauge or indicator on an instrument panel and manipulated so that the one hour mark may be positioned directly opposite the appropriate reading on the fuel quantity gauge. The precise position of the one hour mark on the duration of flight indicator is determined by adding reserve fuel quantity and fuel consumption per hour. For example, if the reserve fuel desired is 3,000 pounds and the hourly consumption rate is 2,500 lbs. per hour, the zero indicator of the linkage 18 is set opposite the 3,000 lbs. of fuel indication on the fuel quantity scale and the one hour mark on the linkage 18 is set opposite the 5,500 lbs. indication on the fuel quantity gauge. With these settings effected, flight duration remaining can now be read directly from the duration of flight indicator using the fuel quantity gauge needle also as a flight duration indicator.

Where a multi-engine aircraft is involved, the flow rate may normally be obtained by multiplying the number of engines and setting the hourly flight duration indicator opposite the appropriate fuel quantity reading, or alternatively, the linkage 18 may be arranged to present data in ratios of 2:1 or 4:1 etc. to accommodate the number of engines involved.

The present invention is of extreme usefulness due to its readily viewed presentation of flight data. The invention may appear in different embodiments than those shown for accommodation in more sophisticated instruments, and may be automatically controlled through a selsyn motor, not shown, which would operate in unison with a fuel flow meter to cause flight indication to follow decrease of fuel quantity. Another alternative form may be a fuel quantity scale that could be offset, or a fully overlapping or secondary scale provided, so that the reserve fuel amount would be shown as a zero fuel reading on the regular fuel scale. This would eliminate the need for a pilot to add the two figures each time he resets the duration of flight scale.

The invention thus provides a pilot with immediate information of flight duration remaining. Obtaining the information requires very little metal or physical effort by the pilot. It is available although the pilot may be preoccupied by performing a multitude of operations or conforming to a variety of safety of flight requirements. The information is easily kept current by a simple twist of a knob as the fuel consumption decreases due to reduced weight of the aircraft. Fixed scales such as those suggested in connection with the embodiment of FIGS. 5 and 6 provide a measurable assistance to a pilot. A number of these scales could be made each for a predetermined average hourly consumption of fuel.

It will be recognized that many modifications and variations of the present invention are possible in the light of the above teachings. It is therefore to be understood that within the scope of the appended claim the invention may be practiced otherwise than as specifically described.

I claim:

A device for presenting instantaneous aircraft flight duration data in conjunction with fuel quantity indications on the periphery of a disc-like primary scale comprising:

a secondary scale constructed in the form of a fan the individual sectors of which are expandably and retractably linked together for selective concurrent and sequential movement as a result of manual manipulation, said fan being concentric with, and rotatably attached to, the face of said primary scale;

said secondary scale being positionable on said scale so that the zero indication on the periphery of said secondary scale may be placed opposite the fuel quantity indication representing the reserve fuel desired; and said secondary scale being graduated such that an hourly indication on a particular sector thereof represents the hourly fuel consumption rate at the time of use;

whereby when said secondary scale is positioned with its zero indication opposite the reserve fuel quantity indication on said primary scale the remaining flight duration will be indicated directly opposite the fuel quantity needle of said device.

References Cited by the Examiner

UNITED STATES PATENTS 1,893,090   1/1933   Kreidler  ---------- 235—84
2,289,038   7/1942   Putnam  ----------- 58—126

RICHARD B. WILKINSON, *Primary Examiner.*

S. A. WAL, *Assistant Examiner.*